United States Patent [19]
Acosta et al.

[11] Patent Number: 5,659,440
[45] Date of Patent: Aug. 19, 1997

[54] DATA CARTRIDGE MAGAZINE WITH INTERFACE TO AUTOMATIC CARTRIDGE ACCESSING DEVICES

[75] Inventors: Donald Charles Acosta, San Jose, Calif.; David Conrad Graves, Tucson, Ariz.; Paul Yu-Fei Hu, Tucson, Ariz.; James Alfred Jackmond, Tuscon, Ariz.; Loyal Keith Whitted, Tucson, Ariz.

[73] Assignee: International Business Machines Corporation, Armonk, N.Y.

[21] Appl. No.: 404,401

[22] Filed: Mar. 14, 1995

[51] Int. Cl.$^6$ ........................................ G11B 15/675
[52] U.S. Cl. ........................ 360/92; 294/168; 294/169
[58] Field of Search ........................ 369/36, 38, 178, 369/192; 360/92; 294/137, 167–169

[56] References Cited

U.S. PATENT DOCUMENTS

| | | | |
|---|---|---|---|
| 3,522,594 | 8/1970 | Gabor et al. | 340/174.1 |
| 4,335,816 | 6/1982 | Rager | 206/444 |
| 4,355,340 | 10/1982 | Butz | 360/133 |
| 4,776,623 | 10/1988 | Manning | 294/498 |
| 4,982,303 | 1/1991 | Krenz | 360/137 |
| 5,231,552 | 7/1993 | Schneider | 360/92 |
| 5,345,350 | 9/1994 | Ellis et al. | 360/92 |
| 5,418,664 | 5/1995 | Ostwald | 360/92 |
| 5,469,310 | 11/1995 | Slocum et al. | 360/92 |
| 5,532,888 | 7/1996 | Acosta et al. | 360/92 |

FOREIGN PATENT DOCUMENTS

| | | |
|---|---|---|
| 0 238 752 | 9/1987 | European Pat. Off. |
| 0 392 620 | 10/1990 | European Pat. Off. |
| 62-40656 | 2/1987 | Japan. |
| 3-63959 | 3/1991 | Japan. |
| 4-157658 | 5/1992 | Japan. |

OTHER PUBLICATIONS

J. H. Koestner et al., "Tape Library Apparatus", *IBM Technical Disclosure Bulletin*, vol. 16, No. 12, May 1974.

*Primary Examiner*—Robert S. Tupper
*Assistant Examiner*—George J. Letscher
*Attorney, Agent, or Firm*—Baker, Maxham, Jester & Meador

[57] ABSTRACT

A cartridge magazine with interfaces to automatic cartridge feeder devices. On one side, the magazine has an open interface that provides unencumbered access by a robotic picker that accesses cartridges for a library. The magazine is accessible on another side by a transport mechanism of an automatic cartridge feeder (ACF). The transport carries a cartridge from the magazine to a drive unit where the data stored on the cartridge is read or new data is written. The interface to the ACF includes a handle member for placing the magazine into the feeder. The magazine is mounted by loading it into the feeder and pushing the handle inward allowing a plunger on the ACF to engage a groove on the handle member that locks the magazine into place. Locking the magazine in place activates a sensor, thereby enabling the operation of the feeder. The interface securely engages the ACF so that the magazine cannot be accidentally dislodged from it. The magazine may be released from the feeder by pulling the handle forward, thereby activating the sensor which sends a signal to disable operation of the feeder. Pulling the handle forward also unlocks the magazine for easy removal. The handle may be extended for ease of carrying the magazine.

9 Claims, 16 Drawing Sheets

DATA CARTRIDGE MAGAZINE WITH INTERFACE TO AUTOMATIC CARTRIDGE ACCESSING DEVICES

CROSS REFERENCE TO RELATED APPLICATIONS

This application is related to application Ser. No. 08/106,256 entitled "AUTOMATIC CARTRIDGE FEEDER WITH PRIORITY SLOT" filed Aug. 13, 1993 by Dale A. Christiansen et at., and to application Ser. No. 08/068,366 entitled "CARTRIDGE MAGAZINE WITH CARTRIDGE PROCESSING STATUS INDICATOR" filed May 27, 1993 by Donald C. Acosta and Paul Yu-Fei Hu, both applications assigned to International Business Machines Corporation.

1. Field of the Invention

This invention relates generally to automatic data cartridge feeders for use with data storage medium drive units, and, more particularly, to a magazine having an interface to such a feeder while also having an interface to a robotic picker or human operator.

2. Description of the Related Art

Computer system tape drive units can be configured to receive tape cartridges, such as Model 3480 and 3940E cartridges by International Business Machines Corporation (IBM Corporation). The cartridges contain a length of magnetic tape upon which data can be written and read. Many tape drive units can mate with an automatic cartridge feeder (ACF) that accepts a tape cartridge and transports it to the drive unit tape transport mechanism and read/write heads. ACF's are available in configurations that accept cartridges one at a time through a single feed slot and configurations that mate with removable cartridge magazines, containing a plurality of tape cartridges, from which cartridges are accepted one at a time.

ACF's having a feed slot for single cartridges permit an operator to sequentially insert tape cartridges that are automatically transported to a drive unit. In this way, the operator has complete control over the order in which cartridges are processed. However, an automatic cartridge feeder with only one slot is inefficient because an operator is occupied with loading and unloading cartridges substantially the entire time the drive unit is being used. Moreover, loose cartridges can be lost, mishandled, or placed out of sequence.

Automatic cartridge feeders that accept removable cartridge magazines can greatly increase operating efficiency and also increase throughput of cartridges to be processed by the drive unit. A cartridge magazine typically includes a plurality of cartridge shelves, each of which receives a cartridge, and is coupled to the cartridge feeder such that the cartridge feeder can transport cartridges from the magazine to the drive unit in the sequence they are stored in the magazine or in a sequence selected by the drive unit, including a random sequence. Typical magazines have a capacity of seven to twelve cartridges.

The cartridge magazine frees an operator from being occupied with the feeder and drive unit and also reduces the number of times an operator must manually intervene to provide fresh cartridges. In a manual library all tasks of loading cartridges into the magazine are performed by humans rather than robots. However, in a manual library containing many ACF's, the repetitive task of providing fresh cartridges is only augmented by the repetitive task of providing fresh magazines. While this greatly increases the efficiency of the operator, there is still a requirement for the operator to perform repetitive tasks.

It is well known that repetitive physical tasks, such as loading and unloading cartridge magazines, can lead to injuries such as carpal tunnel syndrome and soreness of muscles, joints, and tendons. In general, injuries in the work place are costly to business and painful for those injured, such as the operator described above. For this reason, businesses have spent vast sums of money on ergonomics design, also referred to as human factors engineering.

Another objective of human factors engineering is making a product easier to use which in turn makes the user's job easier to do. Unfortunately, such human factors engineering has not thus far provided a data cartridge magazine that enables an operator to complete the task of inserting and removing them in a manner that is easy, fast, and safe from injury.

In addition to manual libraries there are several well known automatic data storage libraries, such as the IBM Corporation 3494 and the IBM Corporation 3495 libraries. These libraries descended from the IBM Corporation 3850 Mass Storage Subsystem introduced in the 1970's. An automated tape library having a robotic picker having at least one gripper for handling a cartridge is disclosed in U.S. Pat. No. 4,654,727. This patent is herein incorporated in its entirety by this reference. Another magnetic tape cartridge library having a robotic picker is described in U.S. Pat. No. 4,864,438, which is also incorporated in its entirety by this reference.

It would be an improvement to the automated data storage library art if automated cartridge feeders could be used in combination with such libraries, to provide a "mechanical cache" of frequently required data in the library. In other words, a bank of multiple automatic cartridge feeders could each be accessed through their respective magazines, by a robotic picker if a magazine providing an interface for such a robot was available. The primary problem with creating such an interface has been the failure to provide an interface, from the magazine to the robot, that would allow continuous processing of the ACF when cartridges are accessed by the robot. If the ACF is interrupted, then the drive unit also must be interrupted, in turn preventing reading or writing, and writing of data, and thus negating the effectiveness of the mechanical cache.

This problem can best be illustrated with reference to FIG. 1 showing a typical prior art magazine 10 having a handle 15 for carrying and a door 11 which is a closed interface to cartridges. The door blocks access to cartridges when the cartridges are being accessed on the other side of the magazine by an automatic cartridge feeder. In such prior art schemes, the door must be moved before any of the cartridges can be removed. However, for safety reasons it is necessary to disable the ACF that accesses the cartridges in the magazine whenever the door is opened. It should be apparent to those skilled in the art that it would be a great improvement to the data processing art to enable the accessing of cartridges in a magazine by robotic pickers without interrupting the operation of any ACF also accessing other cartridges in the magazine. With reference to manual libraries described above, it should also be apparent to those skilled in the art that a closed interface, such as door 11, blocks access to any cartridge in the magazine the ACF is operating.

A typical example of cartridge magazines having a door or closed interface that prevents access of single cartridges while a cartridge feeder is operating can be seen in U.S. Pat. No. 5,231,552, to Schneider et al. The loader for receiving the magazine in the '552 patent is a tilting access door that must be closed to operate the feeder. Another example of a tilting access door for receiving a magazine is shown in European Pat. Application No. EP 0238752 by Andrew. In the Andrew disclosed-device the door must remain closed to operate the feeder and drive mechanism. Still another example of a closed access system is shown in European Patent Application No. EP 0392620 by Fago. In the Fago disclosed-device the magazine has a curved-bar that is pivotable like a door so that it must be pivoted one way to provide access to the cartridges and another way to block access. Access must be blocked in order for the feeder unit to access cartridges from the other side.

Some prior art magazines are equipped with a handle that is small and therefore not well configured for varying hand sizes, and, in particular, is not well adapted for large hands. Such a sizing configuration lends itself to motivating the operator to carry the magazine with his or her wrist facing upward (i.e., with the knuckles of the hand pointing downward, toward the operator's feet). A typical cartridge weighs about one-half pound, and a typical magazine can carry an average of about 10 cartridges. Since the magazine itself weighs about 1 to 1.5 pounds, this means that the wrist of the operator is supporting most of the 6 to 6.5 pounds of weight of the magazine and its contents. It is well known that more of this weight would be carried by other stronger parts of the arm, if the magazine could be carried so that the operator's wrist is pointing downward (knuckles upward). But such a configuration of the handle dictates that the operator must pull upwards on it in order to remove the magazine from an automatic cartridge feeder. Another problem with typical prior art magazines is that many have rigidly fixed handles that have no degrees of freedom. A fixed handle tends to make a magazine difficult to remove and is not well-suited to varying heights of installation, especially relative to operators of varying heights. Further, a fixed handle may add to the risk of injury to an operator because it requires him to bend over or lift weight over his head. Thus, it would be an advancement in the data cartridge processing art if risks to human safety, such as with the problems described above, were greatly reduced while also solving the other interface problems described above.

SUMMARY OF THE INVENTION

An objective of this invention is to provide a data cartridge storage magazine that has an interface to an automatic cartridge feeder (ACF) that allows each stored data cartridge to be engageable by a cartridge transport mechanism in the ACF, while another interface is provided to make the cartridges capable of being engaged and removed by either a human operator or a robotic picker mechanism for a library, without interrupting the active operation of the ACF.

A further objective of this invention is to meet the above described objective while further enabling the magazine's ACF interface to allow for easy and speedy placement and removal of the magazine.

Another objective oft his invention is to further enable the magazine's ACF interface with a mechanism that secures the magazine in place in the ACF until an operator engages the interface to remove the magazine.

A still further objective of this invention is to meet the above described objectives while reducing the risk of injury to a human operator who performs the placement and removal task.

To meet these objectives and to overcome the limitations in the prior art described above, and those that will become apparent upon reading and understanding this specification, this invention discloses a magazine having interfaces to automatic cartridge accessing devices as well as to a robot or human. On one side, the magazine has an open "doorless" interface to an operator or a robotic picker for an automatic data storage library. On the other side, the magazine is accessible to an automatic cartridge feeder (ACF) that transports a cartridge to a drive unit. The magazine's ACF interface includes a handle that is used by an operator to place the magazine in the ACF. The handle engages with a latch bar in the ACF to secure the magazine in place. The ACF interface enables the continuous functioning of the ACF without interruption, when a magazine is present. Removal of the magazine is accomplished by an operator pulling or lifting the handle to release the magazine. Once removed, the handle may be used by an operator to carry the magazines to another ACF or remote storage.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
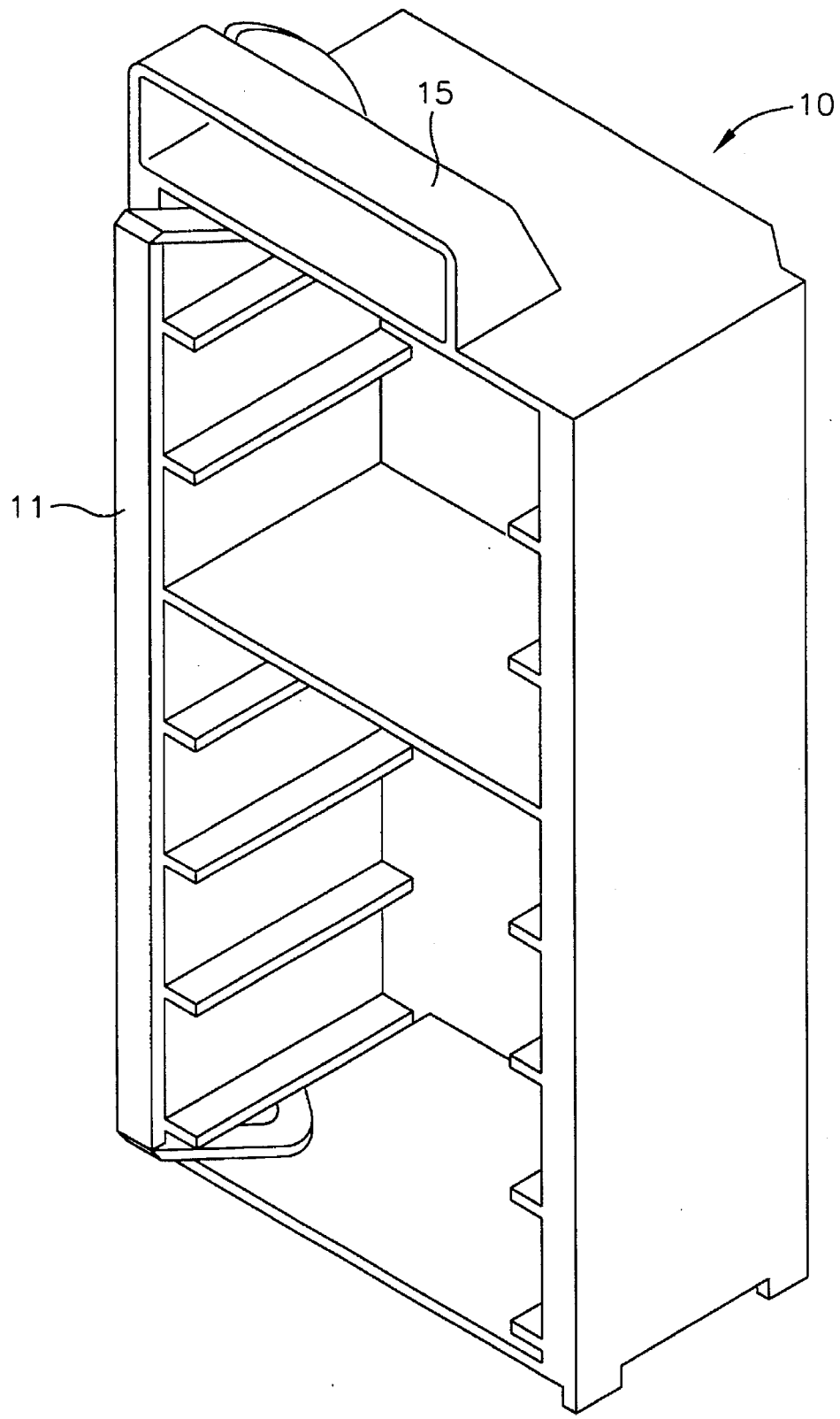
FIG. 1 shows a prior art embodiment of a magazine.
Figure 2:
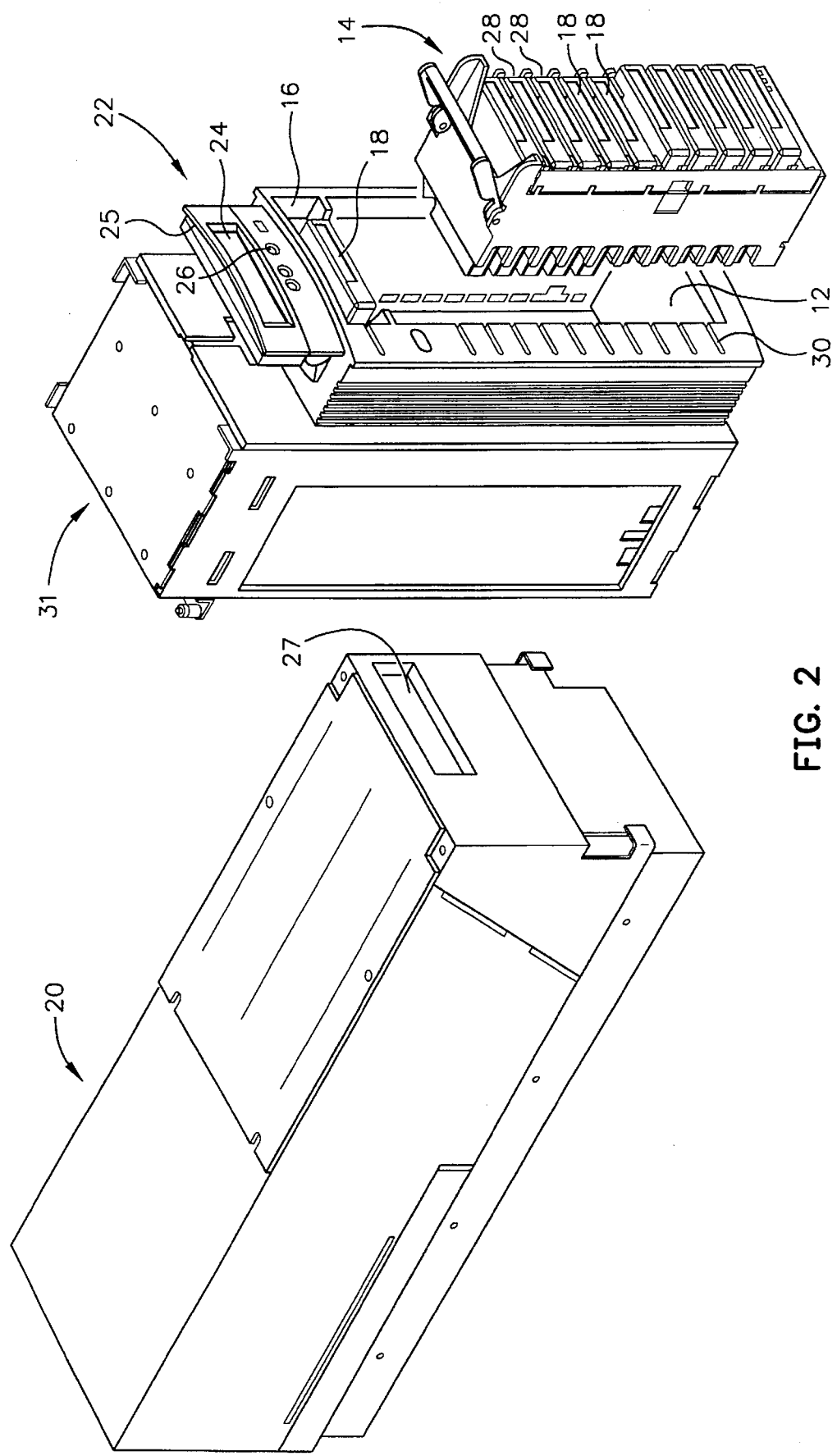
FIG. 2 shows a perspective view of a library comprising the magazine and automatic cartridge feeder (ACF) of this invention, along with a drive unit to which they are attached.

FIG. 2 shows an automatic cartridge feeder 31 constructed in accordance with this invention that includes a magazine slot 12 for mating with a cartridge magazine 14. The tape cartridge can comprise, for example, an IBM Corporation 3480 or 3490E tape cartridge. The automatic cartridge feeder is adapted for engagement with a drive unit 20, which contains a tape transport mechanism and read write heads. The cartridge magazine 14 can be filled with cartridges for processing by the drive unit. When the magazine is mated with the magazine slot 12 of the automatic cartridge feeder 31, cartridges are automatically removed from the magazine, transported to the drive unit and processed, and then returned to the magazine.

FIG. 2 shows that the automatic cartridge feeder 31 includes a display assembly 22 having a liquid crystal display (LCD) panel 24 and a control panel 25 having control buttons 26. The LCD panel is used to display system messages and instructions to an operator. The control buttons 26 are used by an operator to change operating modes, begin and stop procedures, and otherwise control the operation of the cartridge feeder. The display assembly 22 is pivotable for adjustment of viewing angle. Cartridges from the feeder enter and leave the drive unit 20 through an interface slot 27.

The cartridge magazine includes a plurality of cartridge shelves 28, each of which can support a cartridge 18. The cartridge feeder 31 includes a plurality of status indicators 30 located such that an indicator is adjacent each shelf when the magazine is mated with the cartridge feeder. The status indicators are used to inform an operator about the status of the cartridge associated with the indicator. Additionally, the status indicators are used to indicate whether or not the magazine 14 is securely installed in the feeder 31. For example, in a preferred embodiment, when a particular indicator, associated with a particular shelf, is steadily illuminated green that indicates the cartridge stored on that shelf is being processed by the drive unit. Whereas, a non-illuminated state indicates the associated cartridge has already been processed by the drive unit and has been returned to the magazine. An "alert condition" can be indicated by steadily illuminating the indicator yellow, while a more urgent "attention condition" can be indicated by flashing the particular indicator yellow. All the indicators are steadily illuminated green immediately after the magazine is placed in the ACF indicating the ACF is ready to operate. Likewise, a steady yellow illumination of all the indicators means that the magazine has been removed.

Figure 3:
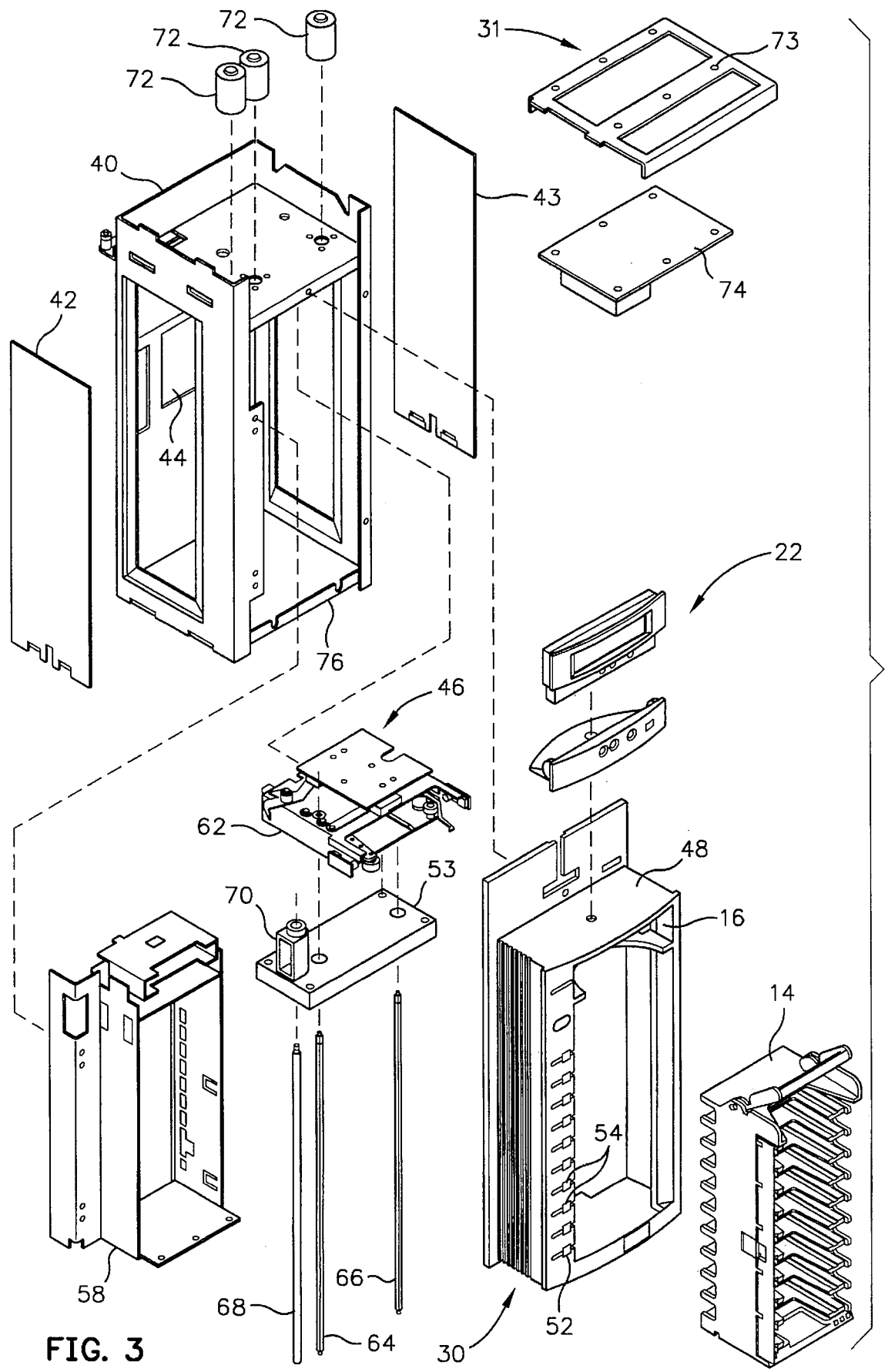
FIG. 3 shows an exploded view of the magazine and automatic cartridge feeder of FIG. 2.

FIG. 3 shows the cartridge feeder 31 in greater detail, along with a cartridge magazine 14. The drive unit 20 is not shown in FIG. 3 for simplicity. FIG. 3 shows that the cartridge feeder 31 includes a housing 40 to which the remaining feeder components are attached. A side panel 42 of the cartridge feeder has been removed to reveal a rear opening 44 in the housing. An opposite side panel 43 is also removed in FIG. 3. The rear opening comprises a feeder/drive unit interface through which cartridges are delivered to the interface slot 27 of the drive unit (FIG. 2). That is, cartridges 18 that are removed from a shelf of the magazine 14 are transported through the feeder rear opening 44. A feeder transport assembly 46 is used for all movement of cartridges within the cartridge feeder, including removal and return of cartridges from the magazine, and also transport of cartridges to and withdrawal of cartridges from the drive unit.

A priority slot 16 is provided in a preferred embodiment, so that the operator can predetermine the order of processing the cartridges. For example, a cartridge placed on the priority shelf will be processed before any others once the drive is no longer busy. The priority shelf is also used for safety purposes. When the magazine is no longer securely positioned, i.e., the operator has begun to remove it by pulling or lifting on the handle, this invention enables almost instantaneous sensing that the magazine has moved. In response the elevator platform 53 attached to lead screw 68 is immediately raised to the level of the priority shelf so that an operator cannot accidentally be hurt by its movement. The enabling of the sensing mechanism will be described in detail below.

FIG. 3 further shows that the from portion of the cartridge feeder 31 comprises a cartridge feeder bezel 48 including the priority slot 16 and the cartridge status indicators 30. The cartridge status indicators 30 comprise a slotted indicator window 52 in the bezel adjacent each cartridge receiving position, such positions including the shelves 28 of the magazine 14, as well as the priority slot which is part of the bezel. In a preferred embodiment, each indicator is illuminated by a two-color light emitting diode (LED) 54 mounted on an indicator board (not shown) that is attached to the bezel shroud behind the cartridge feeder bezel 48. The bezel 48 attaches to a magazine slot frame 58 that in mm is attached to the feeder housing 40. The display 22 is attached to the bezel.

The cartridge magazine 14 holds cartridges on the shelves in position so they can be removed from a shelf by a cartridge feeder tray 62 of the cartridge transport assembly 46 and transported through the rear opening 44 to the drive unit 20 (FIG. 2). The cartridge feeder tray 62 is coupled to three vertical shafts 64, 66, and 68. Two of the vertical shafts 64 and 66 are mounted on opposite sides of the feeder tray 62 and ensure proper positioning and vertical travel of the feeder tray. The third vertical shaft 68 is a threaded lead screw that is coupled to the tray by a fixed nut 70. A system of drive motors 72 rotate the shafts in a prescribed sequence, including the lead screw 68. Because the nut 70 is fixed in place relative to the feeder tray 62, the tray is moved vertically as the shaft 68 is rotated by the motors 72. As is known to those skilled in the art, the lead screw 68 can be coupled to the feeder tray 62 so that rotation of the lead screw also can cause horizontal movement of the tray when a cartridge is to be removed or returned from the magazine, and when a cartridge is to be withdrawn or inserted into the drive unit. The top of the cartridge feeder housing 40 is closed with covers 73 and 74. Finally, the bottom of housing 40 is closed with a bottom cover 76.

Figure 4:
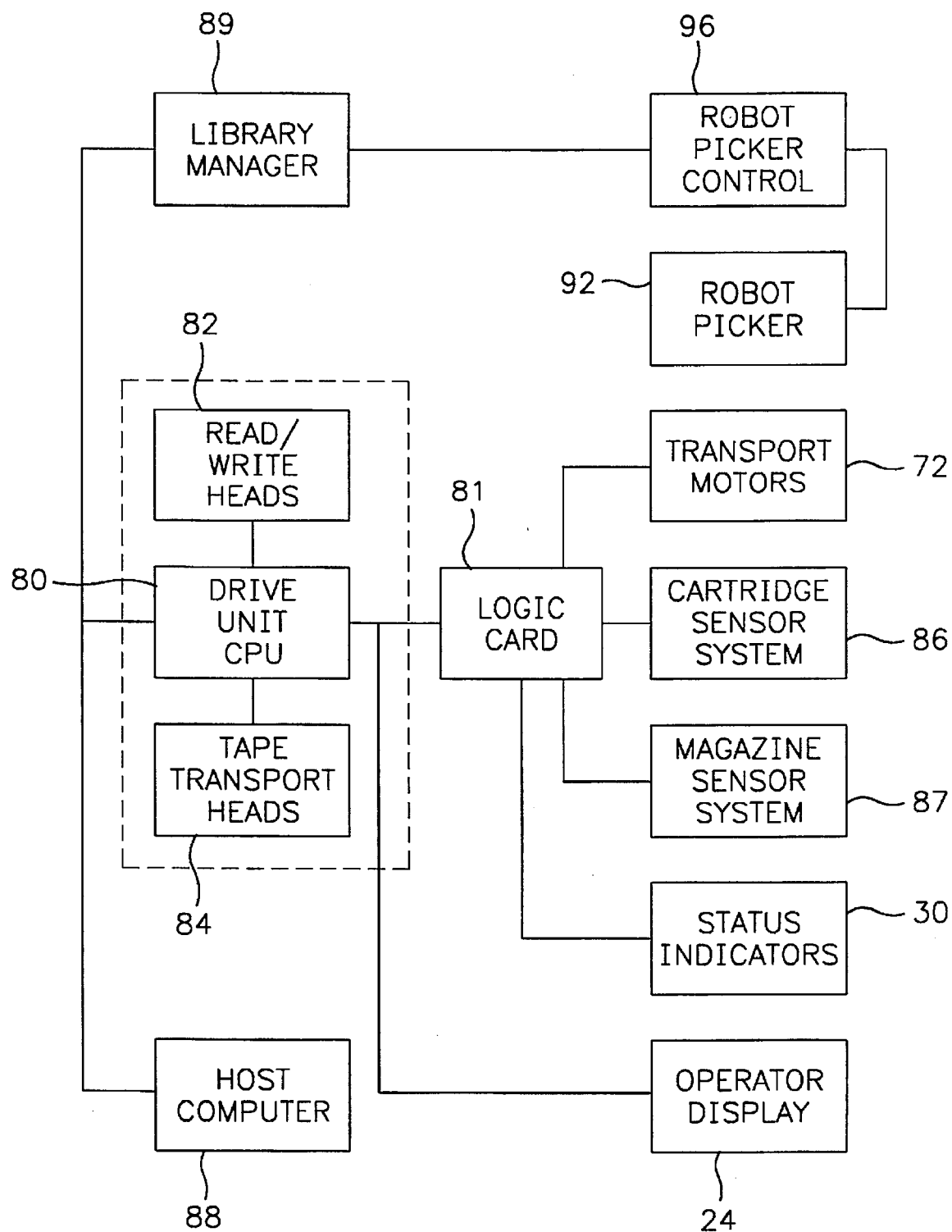
FIG. 4 is a functional block diagram of the library of FIG. 2 together with a block diagram of a robotic control unit and a robotic picker useful with this invention.

Operation of the automatic cartridge feeder 31 will be further understood with reference to the block diagram of FIG. 4. FIG. 4 shows that the cartridge feeder 31 does not include a dedicated microprocessor, rather, all cartridge feeder operations are performed under control of the drive unit 20. In particular, a drive unit central processor unit (CPU) 80 communicates with feeder through a logic card 81 interface. It is to be understood, therefore, that references to the feeder taking action or completing tasks refer to operation of feeder components under control of the drive unit CPU. It also is to be understood that the automatic cartridge feeders can be constructed so that it also includes a central processor unit that controls some or all of the feeder operations.

In addition to controlling the feeder 31, the drive unit CPU also controls read/write heads 82 of the drive unit and controls a tape transport mechanism 84 of the drive unit. The tape transport mechanism winds tape around the heads and controls the tape direction. It is to be understood that if the data storage cartridges handled by the cartridge feeder are not tape cartridges, then the drive unit would include other systems for appropriate processing. For example, magnetic disks would be handled by a disk drive rather than a tape transport, and optical disks would be handled by an optical drive. FIG. 4 also shows that the drive unit CPU 80 controls the feeder motors 72, drives the cartridge feeder LCD operator display panel 24, controls the cartridge status indicators 30, controls a cartridge sensor system 86 and a magazine sensor system 87 in which either sensor system can control the feeder transport assembly 46. Although not shown in FIG. 4, CPU 80 also receives inputs from the cartridge feeder input buttons 26 (FIG. 2). Additionally, FIG. 4 shows that the drive unit CPU 80 is coupled to a host computer 88, also referred to as an initiator, from which the drive unit can receive commands and requests for data.

Library Manager logic 89 provides an interface from the CPU 80 to a coupled robot control unit 96 that is in communication with and provides control commands for robotic picker 92. In a preferred embodiment the Library Manager is software that is loaded into some form of electronic memory, such as random access memory that is typically part of a well-known personal computer (not shown). The robot control unit is alerted by the CPU 80 to the status of a cartridge so that the robot can be commanded properly to only retrieve cartridges that are finished processing.

Figure 5:
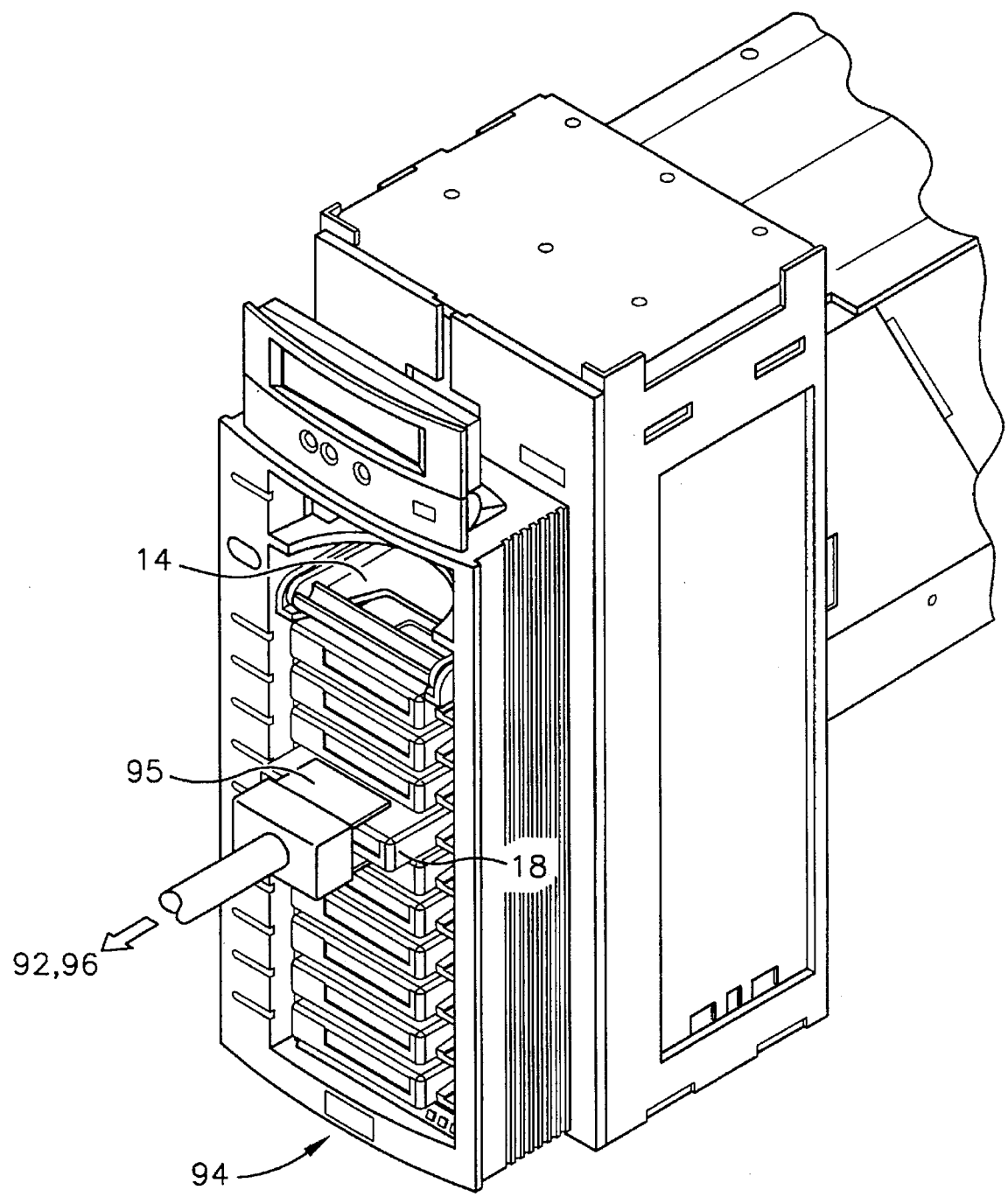
FIG. 5 shows a gripper mechanism of the robotic picker of FIG. 4 engaging a cartridge stored in the magazine of this invention.

FIG. 5 shows the magazine 14 with cartridges 18 in place and the open interface 94 providing unencumbered access to the cartridges. Thus, any cartridge identified by CPU 80 as not being processed by the ACF is accessible to robot 92 because, based on the inventor's critical recognition of the need to provide such an access, the magazine 14 is adapted to work without a door. Since there is no door there is no need to interrupt the ACF operation when a cartridge is accessed, thus an open interface 94 is provided by this invention. Since the invention provides a quick magazine position sensing device, there is no concern for the safety of the operator because the transport assembly cannot be reached with the magazine in place. In a preferred embodiment, robot 92 has a gripper 95 for grasping cartridge 18. For the sake of simplicity robot 92 is not shown in FIG. 5. However, in a preferred embodiment the robotic picker can be a well-known robot used in an automated data storage library, such as the robot described in the incorporated '727 or '483 patents. Also the robot used in the known IBM Corporation 3495 automated data storage library will also work with this invention. It is to be understood that the open interface alternatively provides access to cartridges for a human operator without interrupting the processing of the ACF.

Figure 6:
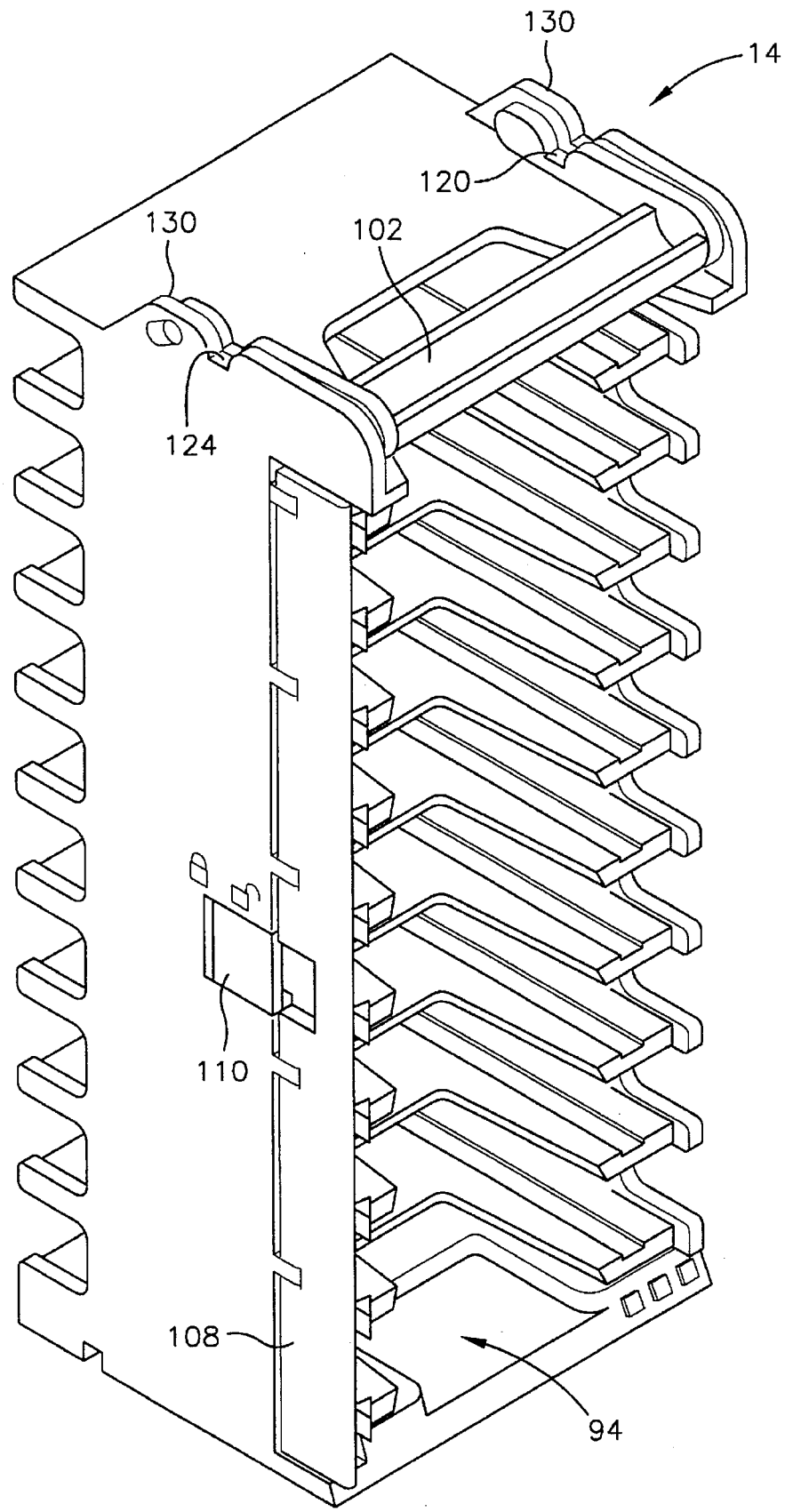
FIG. 6 shows a perspective view of the magazine of FIGS. 2 and 3 including the ACF interface and the open doorless interface for a human operator or the robotic picker gripper of FIG. 5.
Figure 7:
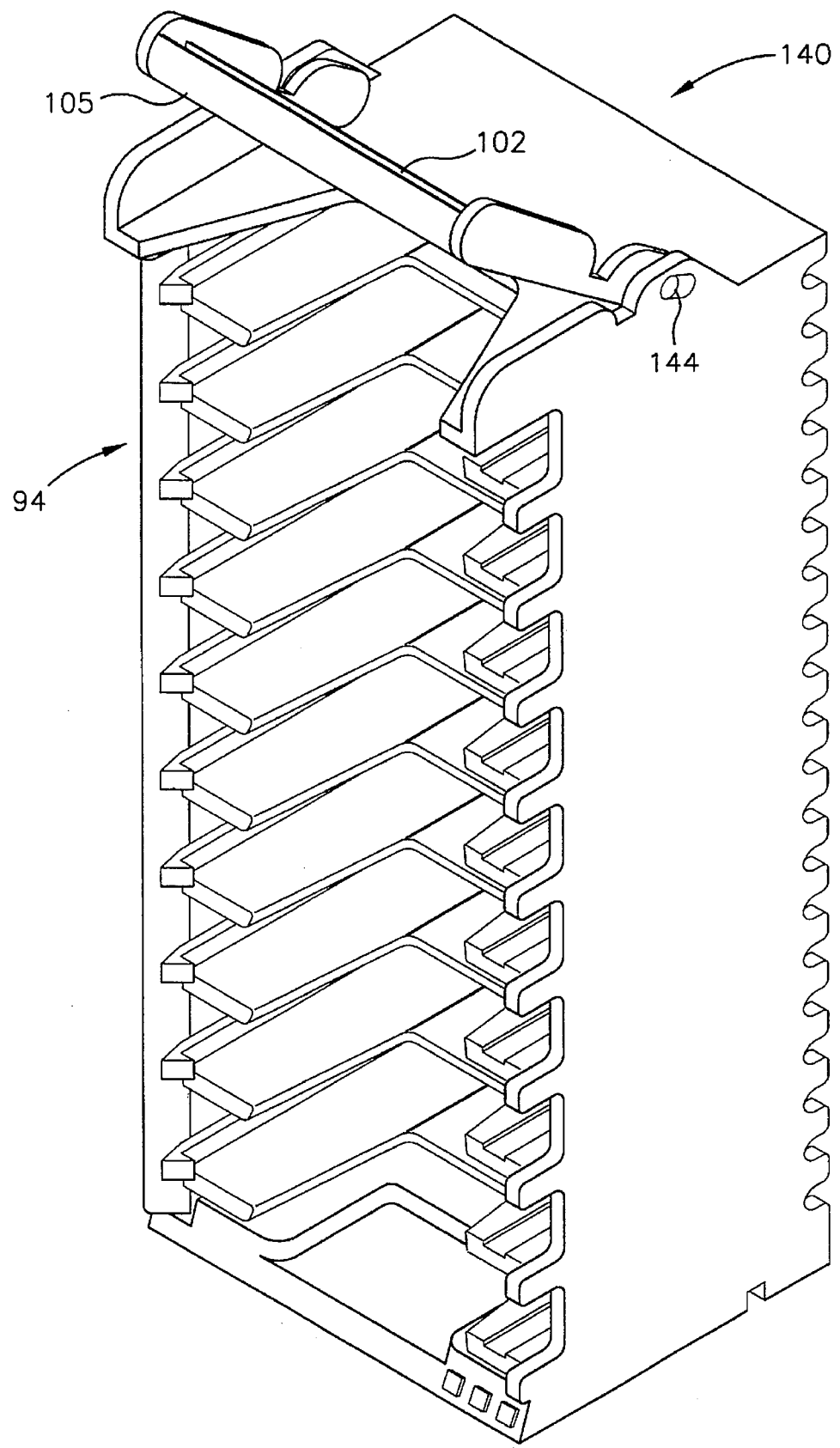
FIG. 7 shows another perspective view of the magazine of FIG. 5 showing the handle member of the magazine's ACF interface in an extended position useful for carrying the magazine.

Referring to FIGS. 6 and 7, the magazine is shown facing opposite sides in each respective perspective view. FIG. 6 shows the magazine with the open interface 94 for either a robot or a human facing outward of the plane of the paper. The handle 102 of the magazine is shown in a non-raised position. The handle has a groove 120 that can be aligned with a groove 124 on the parallelly-disposed rail-guide 130. The grooves are provided for engaging a latch bar (discussed below with reference to FIG. 9) that is integrally attached to the ACF 31. The latch bar, handle, and rail-guide form an ACF interface for the magazine.

A cartridge retaining rib 108 (FIG. 6) is adapted by a spring and lever (not shown) in communication with lock 110 to hold the rib in position across the from of the magazine when it is removed from the ACF. The rib forces the cartridges to stay in the magazine when the magazine is removed from the feeder and carried by a human to another location. However, when the magazine is placed into the feeder the lock 110 is automatically opened, and the spring pulls the rib 108 away from the open interface 94. Thus, the cartridges are available for removing and replacing by a human or a robot without having to open a door or some other form of closed interface as is typical in prior art magazines.

In FIG. 7, the transport access opening 140 is shown facing backwardly from the plane of the paper. Cartridges may be transferred through this opening and transported to the drive unit for processing, at the same time that cartridges are accessible on the opposite side through open interface 94 to either a robot or human operator. FIG. 7 also shows that pivot and sliding slot 144 impart the unique ability of handle 102 to be used to remove the magazine from any elevation. Based on the inventor's critical recognition that the ACF 31 may be placed at varying elevations, this invention provides "elevation-sensitive" removal of the magazine. If the ACF 31 is placed at a position below the operator's normal reach, then the magazine may be removed in the following fashion. The operator may simply lift the handle 102 near the center 105, and then pull the handle toward himself (away from the ACF). If, however, the elevation of the ACF is above the operator the handle may be simply pulled toward the operator. The inclined slot 144 allows the handle to slide when pulled or pushed, depending on the position of the handle in the slot.

FIG. 7 further shows the handle 102 in an upright extended position that can be used for carrying the magazine. The inventors have recognized that such a slidable pivotable configuration coupled with a sufficiently large handle (relative to the width of the magazine) allows an operator to carry the magazine with the wrist downward thus relieving the wrist of the stress of the magazine weight and thereby reducing the risk of injury to the operator.

Figure 8A:
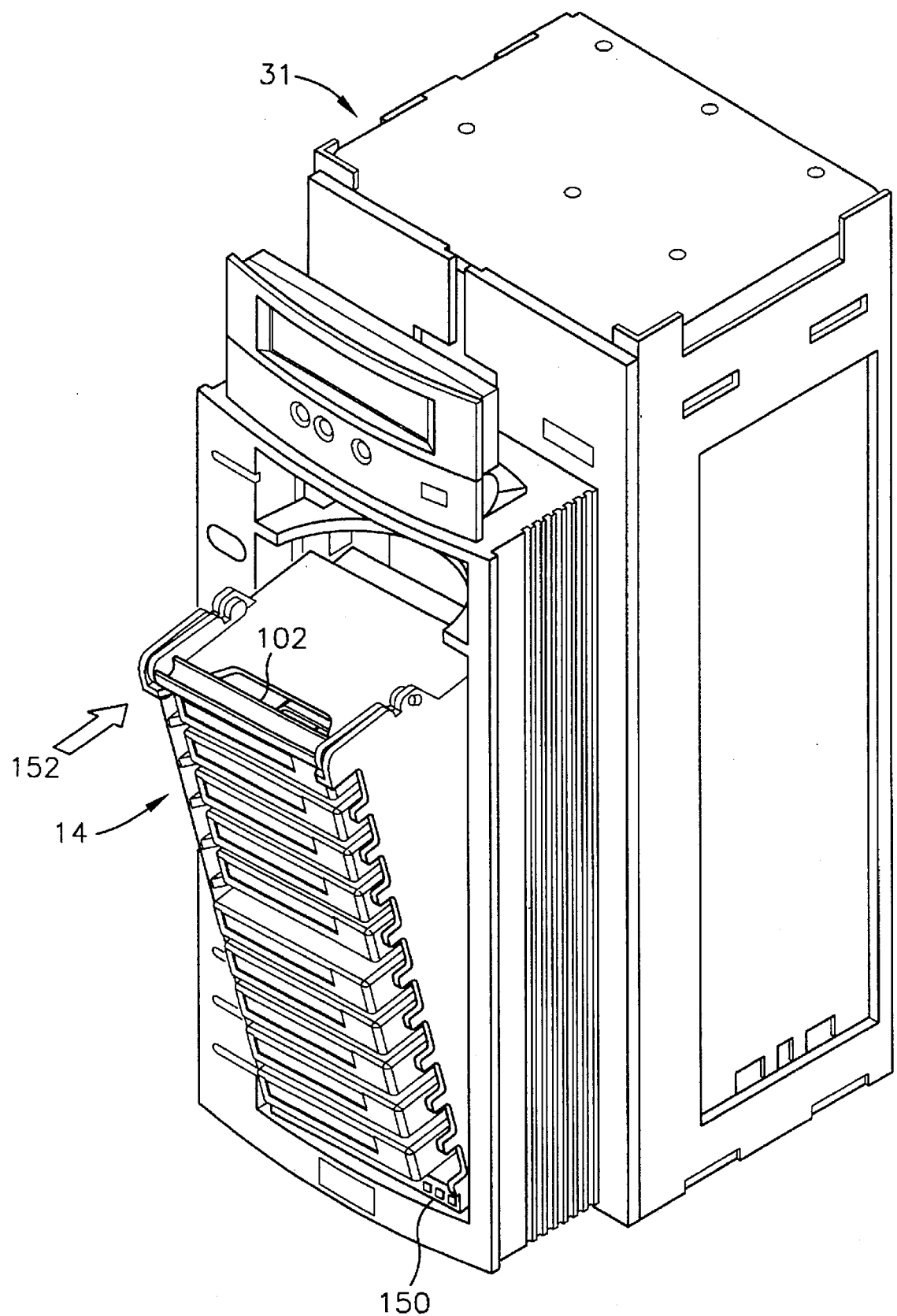
FIG. 8A shows the magazine of FIGS. 6 and 7 being inserted into the ACF of FIGS. 2 and 3.
Figure 8B:
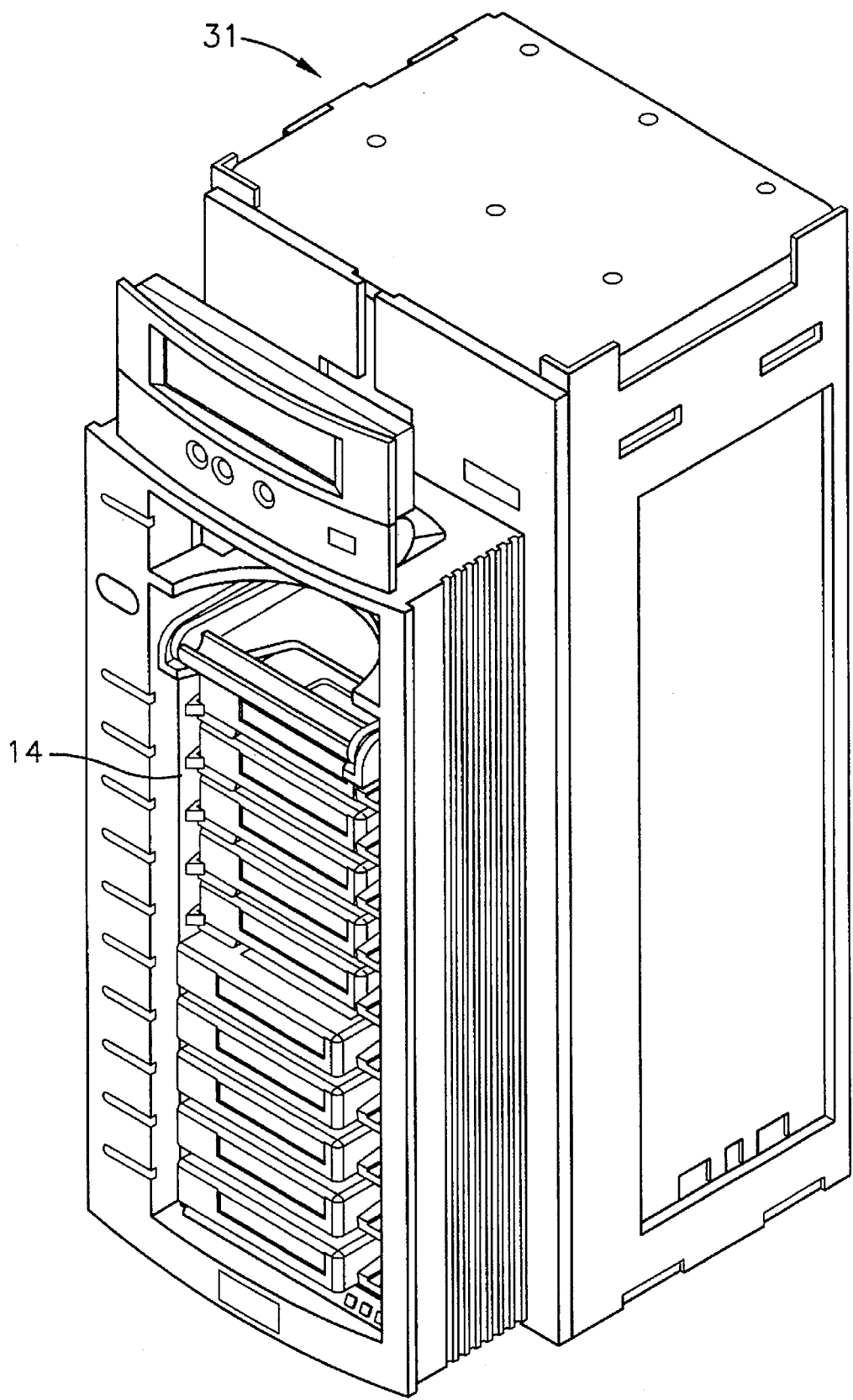
FIG. 8B shows the magazine of FIGS. 6 and 7 in a secure position in the ACF of FIGS. and 3 after being inserted as shown in FIG. 8A.
Figure 8C:
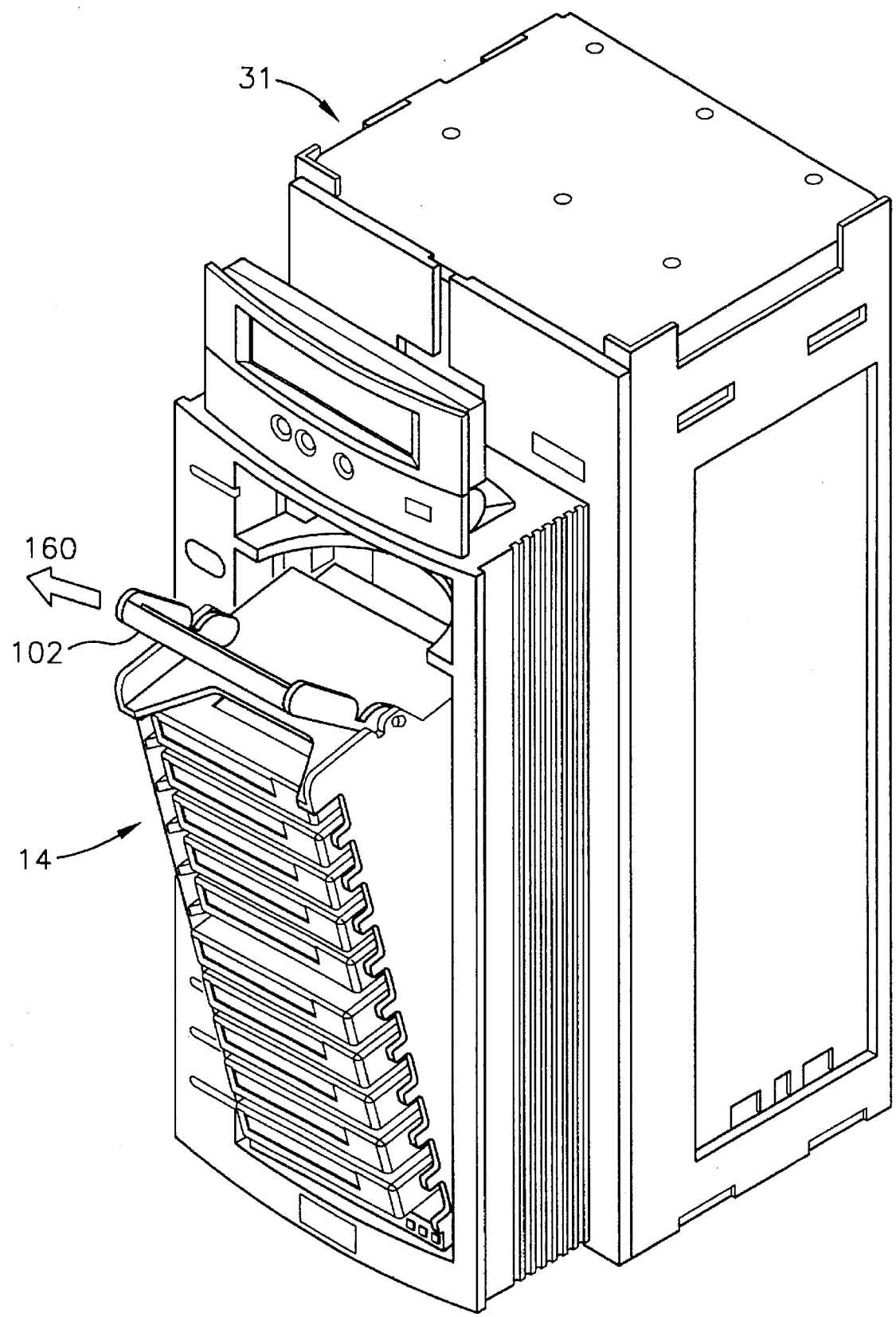
FIG. 8C shows the magazine of FIGS. 6 and 7 being removed from the ACF of FIGS. 2 and 3.

FIGS. 8A, 8B, and 8C show the magazine in insertion mode, secured mode, and in the removal mode, respectively. In FIG. 8A the magazine 14 is shown being inserted into the ACF 31. In a preferred embodiment the magazine is lifted at the handle to clear the lip 150 of the ACF magazine slot 12. Once the magazine has cleared the lip it extends at an approximately 45-degree angle from the ACF. The operator simply needs to push on the magazine in direction 152 until an "audible click" is heard indicating the magazine is securely in position. Such a securely positioned arrangement is shown in FIG. 8B. FIG. 8C shows the magazine being removed by an operator simply pulling on handle 102 in direction 160. The pull on the handle causes the magazine to become unlocked. As described above, such a removal technique is important when the magazine is placed at a level relatively high compared to the operator's reach. When the magazine is placed low compared to the operator's reach, the pivoting and sliding configuration of the handle allows the magazine to be removed by pulling up on the handle.

Figure 9:
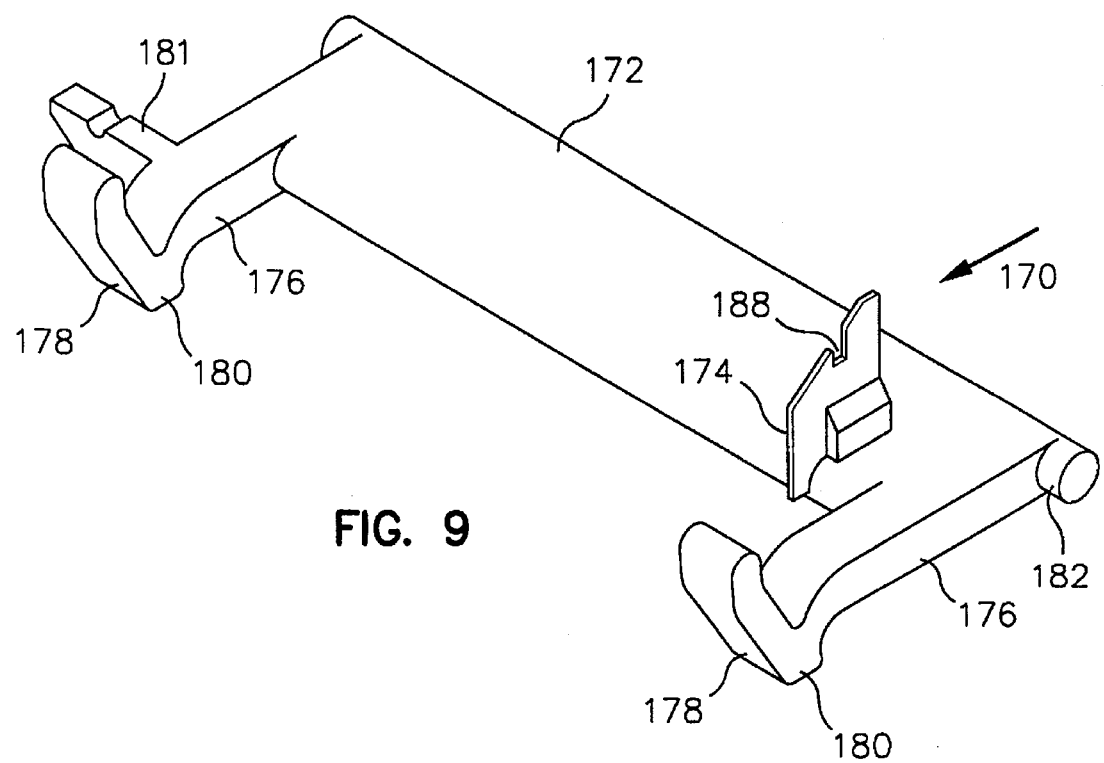
FIG. 9 is an isometric view of the latch bar member of the ACF of FIGS. 2 and 3, that is adapted to be engaged by handle of the magazine of FIGS. 6 and 7.

FIG. 9 shows an isometric view of the ACF latch bar 170 that is configured to mate with handle 102 of the magazine. The mating aspect is discussed below, with reference to FIGS. 10A–10G that describe the relationship of the handle and latch bar during the insertion, secure, and removal cycle of FIGS. 8A, 8B, and 8C. The latch bar is preferably substantially U-shaped, having a cross member 172 supporting a sensor flag 174, and two handle receiving arms 176. At the end of each arm is a substantially V-shaped plunger 178 having a plunger nose 180 at its tip. Pivot pins 182 allow the latch bar to move in relation to the other members of the ACF interface including the handle 102 and rail-guide 130. A support arm 181 attaches to a side of magazine 14. The sensor flag is equipped with a window 188 that is positioned to allow a beam to pass when the magazine is inserted. Moving the magazine also moves the flag which blocks the sensor. The sensor remains blocked until the handle and latch bar are re-engaged.

Figure 10A:
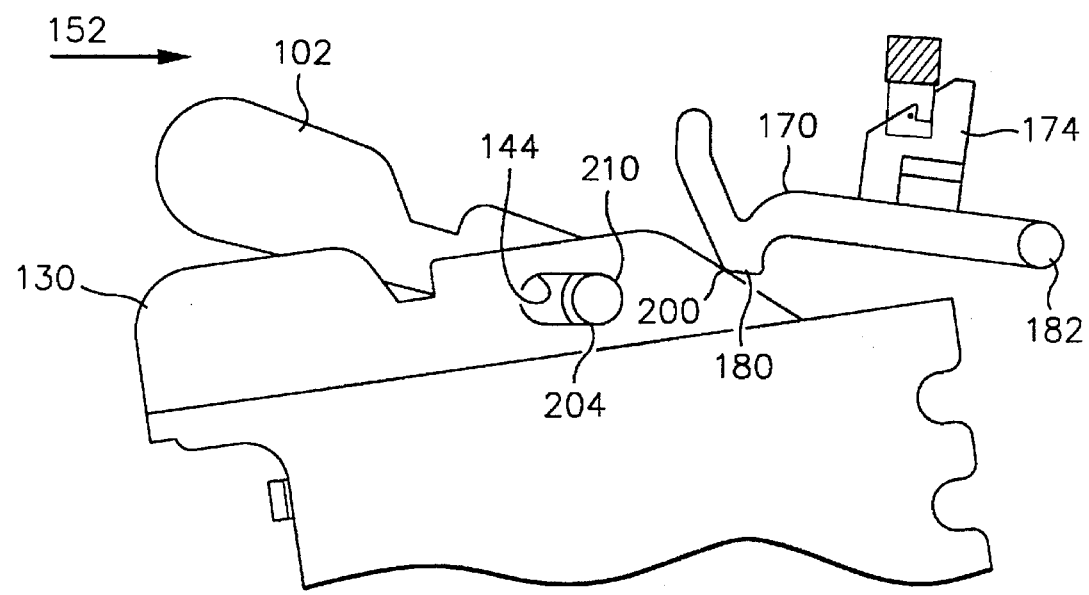
FIGS. 10A, 10B, 10C, 10D, 10E, 10F, and 10G show the interrelationship of the members of the ACF interface of FIGS. 6 and 7 during the cycle of insertion, securement, and removal depicted in FIGS. 8A, 8B, and 8C, respectively.
Figure 10B:
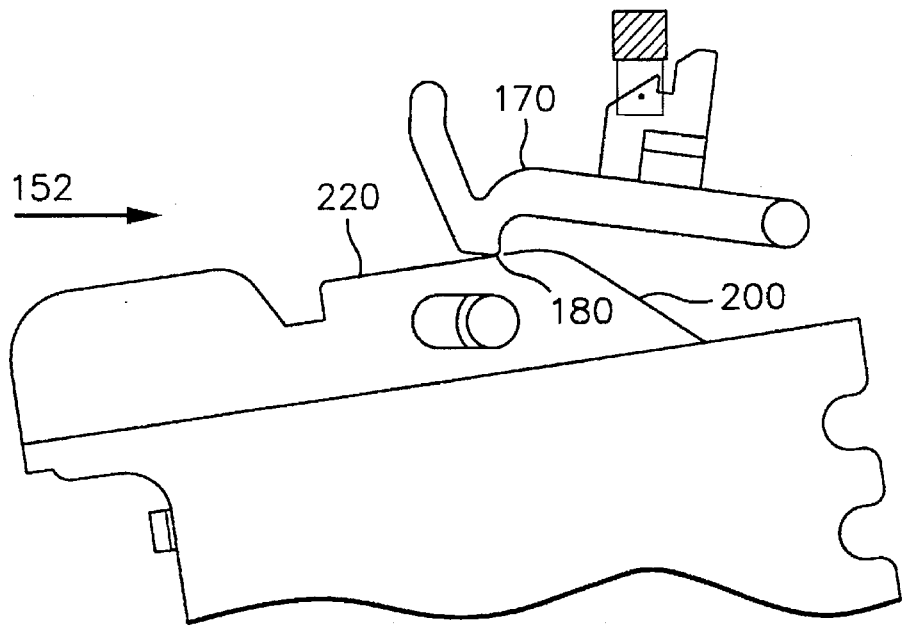

FIGS. 10A–10G illustrate the relationship of the members of the ACF interface including the latch bar 170 attached to the ACF, the handle 102, and guide-rail 130 attached to the magazine during the stages of magazine insertion, locking, and removal shown in FIGS. 8A–8C. FIG. 10A shows the ACF latch bar at a starting position of insertion, wherein guide-rail ramp 200 just begins initial contact with plunger nose 180 of the latch bar 170 when the handle's pivot pin 204 is slid to end point 210 in slot 144. The pivot pin is initially slid to the end point by the operator pushing on the handle in direction 152 after placing the magazine in the insert begin position shown in FIG. 8A. (Note, the directions indicated are relative to the magazine body.) Once the pivot pin reaches that end point, then operator pushing the handle in direction 152 causes the ramp 200 of the guide-rail to approach and eventually contact the nose 180 of the ACF latch bar. FIG. 10B shows that the continued pushing in direction 152 essentially pushes the guide-rail 130 under the nose 180 and causes it to climb past ramp 200 to the flat portion 220 of the guide-rail.

Figure 10C:
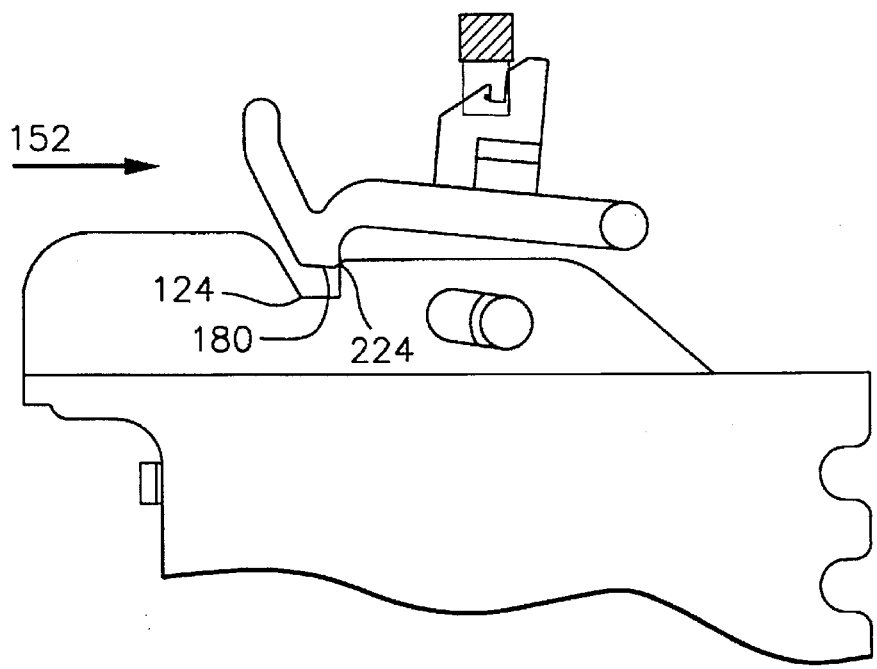
Figure 10D:
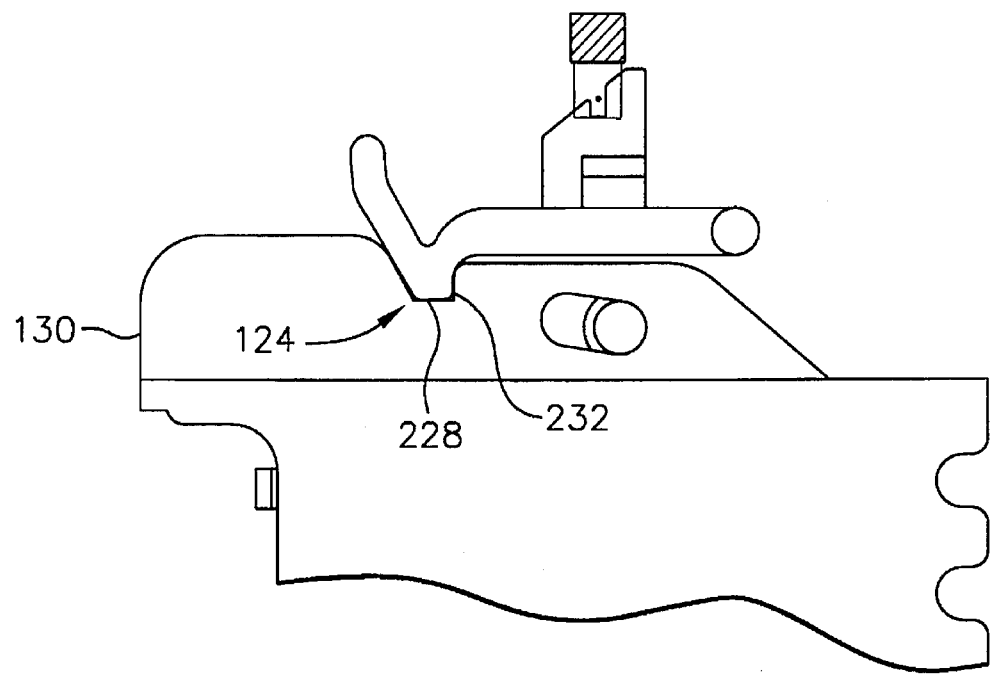

FIG. 10C shows the nose 180 of latch bar 170 translated to position 224 at the edge of groove 124 on the guide-rail. The translation of the nose is caused by the relative motion of the guide-rail and attached handle as the handle is pushed in direction 152. FIG. 10D shows that as the handle is pushed further in direction 152, the plunger nose 180 drops into seat 228 of groove 124 of the guide rail. Because of the steep dropoff, caused by the height and approximately perpendicular angle relationship of groove back wall 232 to seat 228, two advantages are created. The first advantage is that when the accelerating plunger nose 180 contacts the seat 228, the "audible click" noise is made, thus alerting the operator that the magazine is securely locked with the latch bar of the ACF. This signals that the insertion stage is complete and the magazine is now in the locked or secured stage. A simplified overview of the locked stage is shown in FIG. 8B. The second advantage of the relationship is that a considerable force is needed to dislodge the latch bar, unless the handle is pulled in the opposite direction of 160 to release the latch bar, thereby ensuring that an operator or robot will not accidentally remove the magazine from the ACF when a single cartridge is removed from the magazine.

Figure 10E:
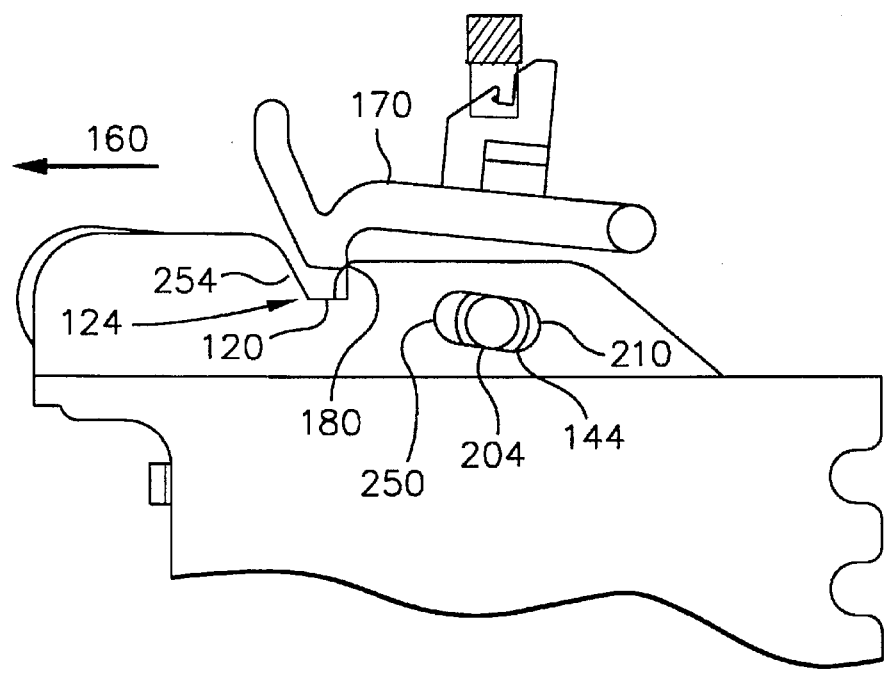

The removal stage is shown beginning in FIG. 10E. The removal stage is begun by an operator pulling outward or upward (i.e., lifting) in essentially direction 160 on the handle 102. It should be understood that the removal force could be imparted by an essentially lifting action because the handle pivot pin 204 slides and pivots in guide-rail slot 144. Whether the operator pulls or lifts depends on his reach position relative to the position of the handle. In either case the pivot pin moves from the bottom end point 210 of slot 144 toward its top end point 250. Once the pivot pin is at the top of the slot, further pulling in direction 160 causes the magazine handle and the latch bar to become disconnected, thereby unlocking the magazine. The disconnection occurs as a result of relative motion between the handle and the guide rail that is caused by pulling on the handle when the pivot pin is at the top of the slot. This motion causes groove 120 in the handle 102 to move relative to the guide-rail groove 124, which causes a prying force to be exerted on the plunger nose 180, in turn forcing the entire plunger 178 out of both grooves. This prying force separates the latch bar plunger from both of the respective grooves so that the magazine may be removed. To facilitate the separation, it is preferred to configure guide-rail groove 124 with a slightly curved front wall 254 to make the translation of the latch bar easier.

Figure 10F:
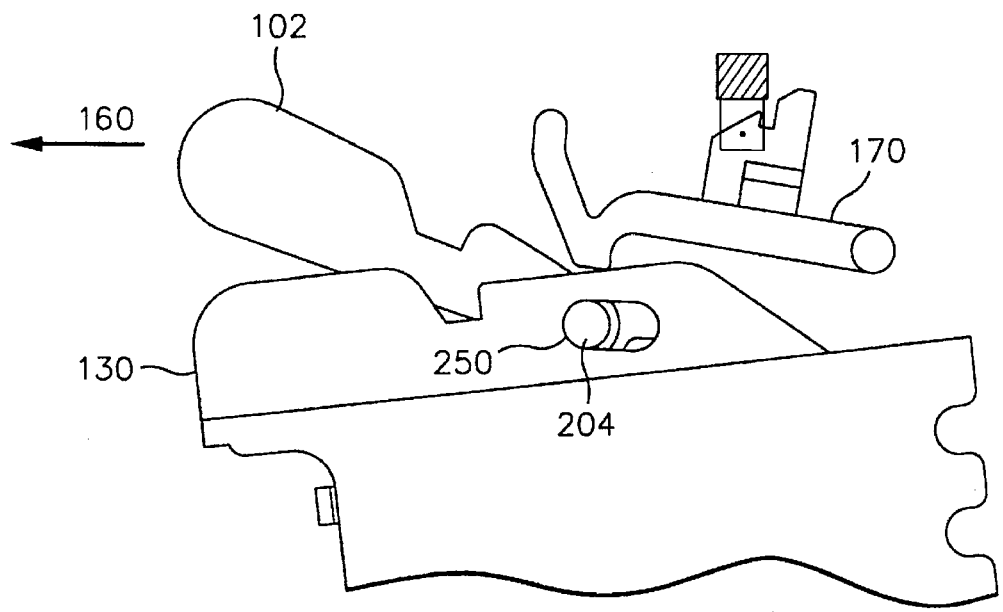
Figure 10G:
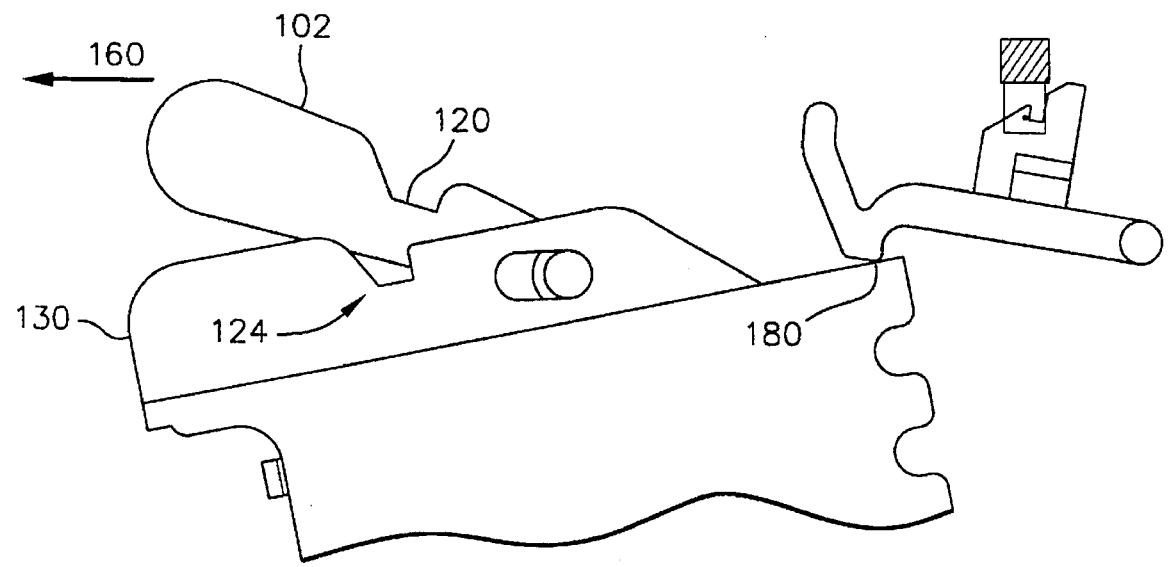

FIG. 10F shows the guide rail groove 124 having been moved further away from latch bar plunger nose 180, as the removal process is continued by pulling or lifting the handle in direction 160. Finally, FIG. 10G shows the plunger nose 180 returned to a position relatively distant and disconnected from the groove 124 as the removal process is near the very end, before the magazine is carried away from the ACF. The near end position of removal corresponds to the overall view shown in FIG. 8C.

Figure 11:
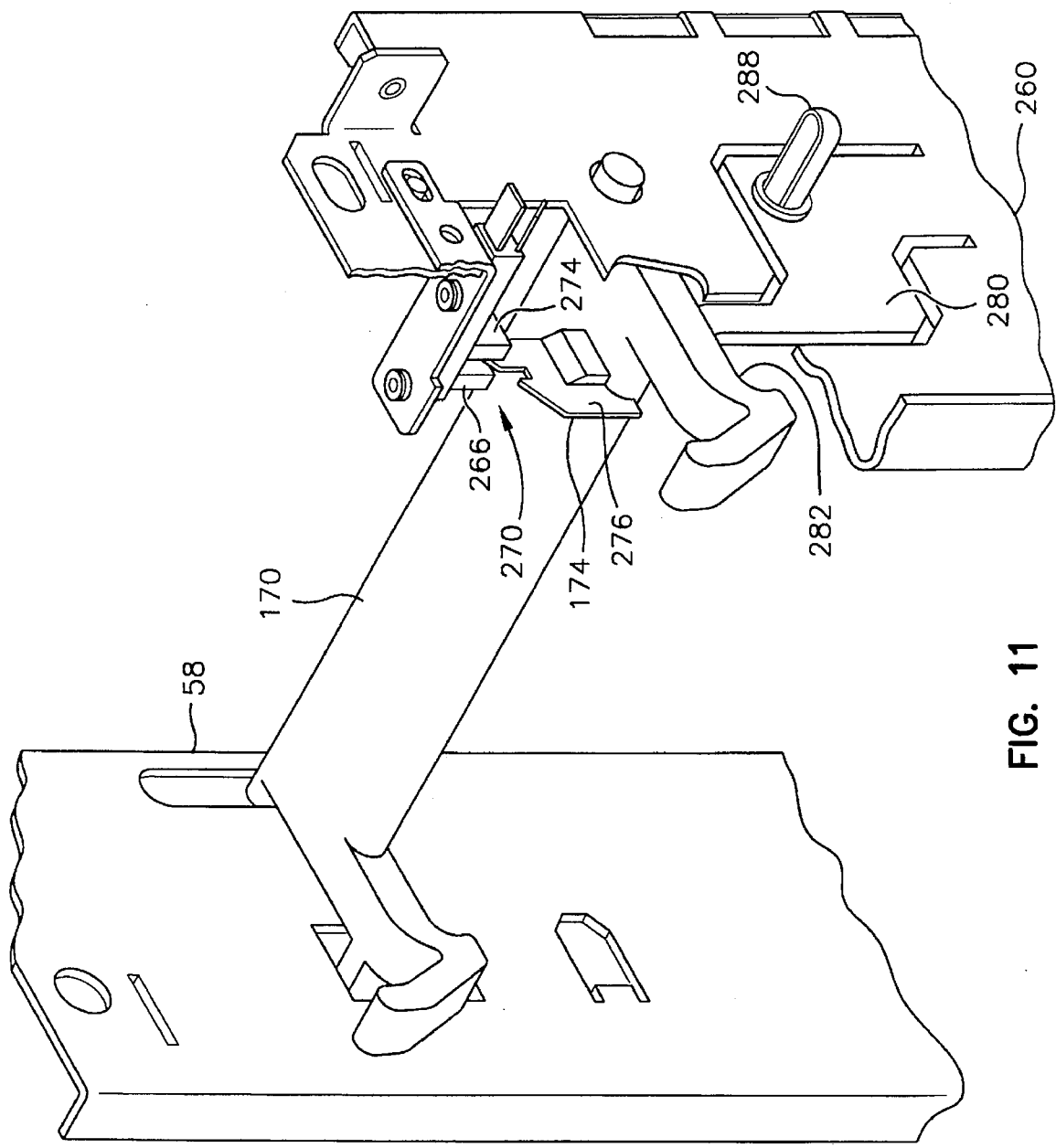
FIG. 11 is a cut-away perspective view of the ACF of FIGS. 2 and 3 engaging the ACF interface of FIGS. 6 and 7 and showing the interaction of the latch bar member of FIG. 10 with a sensing device that indicates the presence of absence of the magazine in the ACF.

FIG. 11 is a cut-away perspective view of the latch bar shown in relationship to the side 260 of the magazine slot frame 58 and the sensor device which is part of the ACF. Recall that the positioning of the latch bar 170 in side 260 of the magazine slot frame is also shown. The handle and other parts of the magazine and ACF are not shown for simplicity's sake. When the handle is pushed in direction 160 during the magazine insertion stage, the latch bar is effectively elevated onto the guide-rail (FIGS. 10A–10F). In so doing, the sensor flag 174 is moved into a position that allows a light beam to pass from a light emitter 266 of the sensor 270 through the window 188 (FIG. 9) in the flag 174 to the sensor's photoelectronic light receiver 274. Any well known optical light sensor will work well for this purpose. When the magazine is removed, receiver 274 does not receive light, because the optical path is blocked by a non-windowed section 276 of the flag. The slightest movement of the handle, typically caused by an operator removing the magazine, moves the window out of position and the beam is broken. When this happens a signal is sent to CPU 80 and the ACF operation is interrupted. Safety is enhanced because the signal is sent very quickly, therefore no door is needed on the front of the magazine and the open interface of this invention is made possible. To keep the sensor from flickering a metal spring 280 is attached to the side 260 of the magazine slot frame 58 that extends a pawl 282 outward to support the latch bar. When the magazine is inserted causing spring activation button 280 is depressed by the side of the magazine, releasing the latch bar 170.

Figure 12:
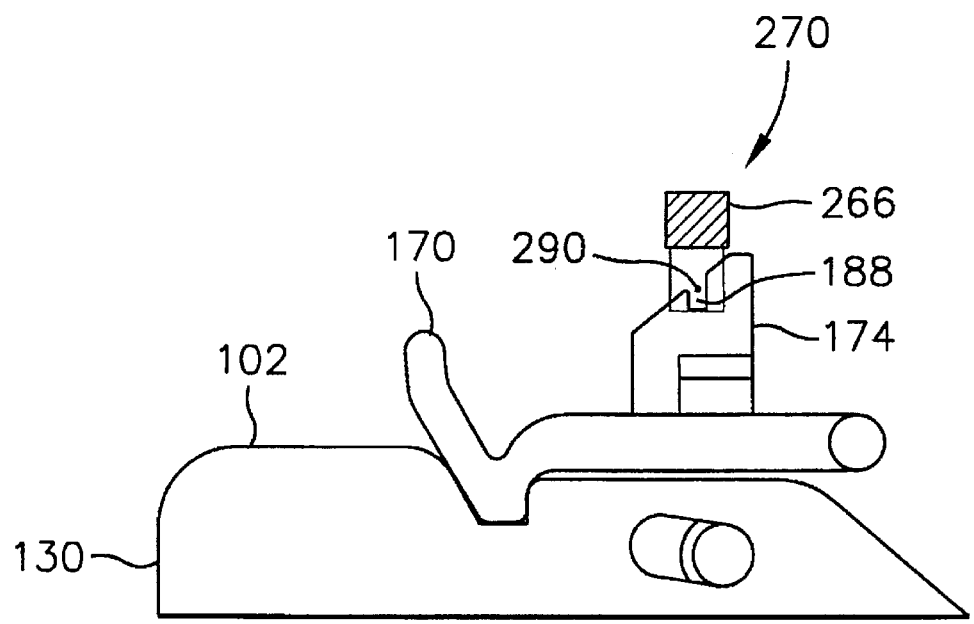
FIGS. 12 and 13 are side views of the latch bar member of FIGS. 10 and 11 showing the respective activation and deactivation of the sensing device of FIG. 11.
Figure 13:
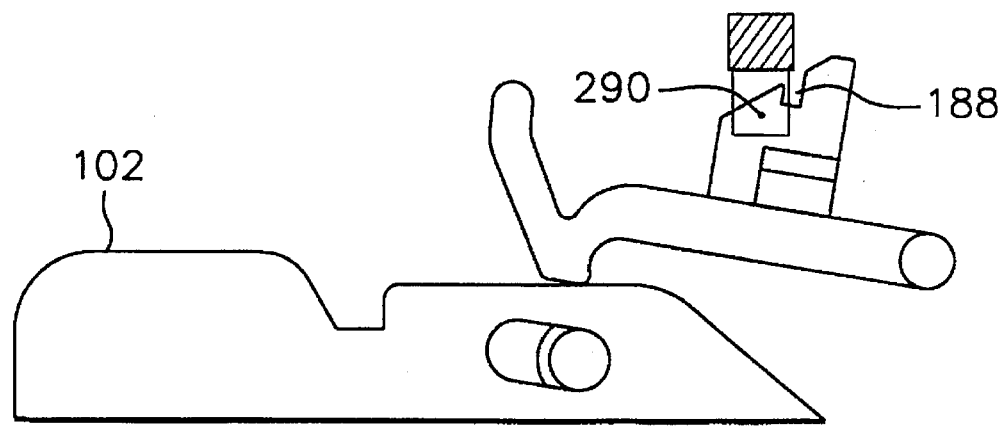

For the sake of clarity, FIGS. 12 and 13 further illustrate the interaction of the flag 174 on the latch bar 170, as the latch bar is moved on the guide-rail. Sensor 270 has light emitter 266 that normally emits light beam 290. FIG. 12 shows that when the latch bar is placed in a seated position in the respective grooves of the handle and the guide-rail, the window 188 of the flag allows the light beam 290 to pass through itself. This indicates to the CPU 80 that the feeder may be operated. FIG. 13 shows that when the magazine handle and latch bar release each other, the latch bar is moved and the window also moves so that light beam 290 is blocked by the non-windowed portion of the flag. This indicates to the CPU that the feeder may not be operated.

Regarding materials of construction, it is best to assemble the entire magazine, including the ACF interface parts of the handle and guide-rail and the open-interface shelves of a polycarbonate material available from the General Electric Corporation. Similarly, the ACF interface latch bar is best composed of a polycarbonate material. However, any high-strength and resilient material, such as well-known plastics having these characteristics will also work well.

This invention provides a magazine that provides an interface to an ACF that ensures safe and easy insertion and removal of the magazine from a variety of elevations, and also ensures secure retention of the magazine until the insertion or removal is initiated by an operator. The magazine of this invention further provides an open interface that allows a robotic picker or a human to access a cartridge stored in the magazine without interrupting the operation of an automatic cartridge feeder. In this way, this invention overcomes the disadvantages of the prior art while enabling new advantages not possible with prior art configurations, such as a mechanical data cache in an automated storage library.

The present invention has been described in terms of a presently preferred embodiment so that an understanding of the present invention can be conveyed. There are, however, many configurations for cartridge feeders not specifically described herein, but for which the present invention is applicable. The present invention should therefore not be limited to the particular embodiment described herein, but rather, it should be understood that the present invention has wide applicability with respect to cartridge feeders generally. Additionally, this invention has been described with reference to tape cartridges but the principles of the teachings apply to any type of medium storing data cartridge that is housed, such as a magnetic or optical disk. All modifications, variations, or equivalent arrangements that are within the scope of the attached claims should therefore be considered to be within the scope of the invention.

What is claimed is:

1. A magazine for a cartridge feeder (CF) having a cartridge transport mechanism, the magazine comprising:
   a frame surrounding a multiplicity of storage shelves for storing therein a multiplicity of data storage cartridges;
   an opening on a first side of the storage shelves for transporting cartridges through to the transport mechanism;
   a CF interface that is adapted to position the magazine relative to the CF by including a handle on the magazine that is pivotable about a pivot pin and slidable relative to the CF, and is further adapted to couple the magazine to the CF; and
   an opening on a second side of the storage shelves for allowing access to at least one cartridge of the multiplicity of data storage cartridges without interrupting operation of the CF;
   wherein the CF interface further includes a latch bar that is attached to the CF that is adapted to engage the handle when the magazine is positioned relative to the CF and the magazine further comprises:
   a rail-guide attached to the magazine adjacent to the handle having an elongated body with a top side, and also having a substantially longitudinal slot disposed in the body that is adapted for receiving the pivot pin of the handle and further adapted for providing a sliding path for the handle;
   a plunger configured to depend from the latchbar in a direction substantially toward the rail-guide when the magazine is coupled to the CF; and
   a groove disposed in the top side of the rail-guide that is adapted to receive the plunger to couple the magazine to the CF; and wherein
   the frame supports a light sensor and the latch bar includes a flag that moves relative to the frame with the latch bar, such that when the plunger of the latch bar engages the groove of the rail-guide then the light sensor is activated by the flag to indicate that the magazine is coupled to the CF.

2. The magazine of claim 1, wherein the flag is adapted to indicate that no magazine is coupled to the CF when the latch bar is disengaged from the groove of the handle.

3. A magazine for an automatic cartridge feeder (ACF) having a cartridge transport mechanism, the magazine comprising
   a frame supporting a multiplicity of storage shelves for storing therein a multiplicity of data storage cartridges;
   an opening on a first side of the storage shelves for transporting cartridges through to the transport mechanism;
   an ACF interface including a pivotable and slidable handle having a groove disposed on a surface thereon, the handle being adapted for positioning the magazine relative to the ACF and for securing the magazine in a fixed position relative to the ACF, wherein the ACF includes a latch bar having a depending plunger that is adapted to engage the groove disposed in the handle thereby securing the magazine relative to the ACF; and
   an opening on a second side of the storage shelves for allowing access to at least one cartridge of the multiplicity of data storage cartridges without interrupting operation of the ACF;
   wherein the frame supports a light sensor and the latch bar includes a flag that moves relative to the frame with the latch bar, such that when the plunger of the latch bar engages the groove of the handle then the light sensor is activated by the flag to indicate that the magazine is present.

4. The magazine of claim 3, wherein the flag is adapted to indicate that no magazine is present when the latch bar is disengaged from the groove of the handle.

5. A coupling interface between a magazine and a cartridge feeder (CF), wherein the magazine stores a multiplicity of data storage cartridges on shelves in a frame and mates with the cartridge feeder, which includes a cartridge transport mechanism that automatically removes and returns cartridges from the magazine during CF operation, the interface comprising:
   a handle attached to the magazine that is pivotable about a pivot pin and slidable relative to the CF and engages manual coupling of the magazine to the CF and transport by a human operator; and
   a latch bar attached to the CF that is adapted to engage the handle when the handle is moved in a first direction and release the handle when the handle is moved in a second direction; wherein:
   the handle is moved in a second direction by pulling or lifting on the handle thereby causing the latch bar to release the handle.

6. A coupling interface between a magazine and a cartridge feeder (CF), wherein the magazine is adapted for storing a multiplicity of data storage cartridges on shelves in a frame for use by a cartridge feeder having a cartridge transport mechanism, the interface comprising:
   a handle attached to the magazine that is pivotable about a pivot pin and slidable relative to the CF;
   a latch bar attached to the CF that is adapted to engage the handle when the handle is moved in a first direction and release the handle when the handle is moved in a second direction;
   a light sensor attached to the frame of the magazine; and
   a flag attached to the latch bar that moves relative to the frame with the latch bar, such that when the latch bar engages the groove of the handle then the light sensor is activated by the flag to indicate that the magazine is coupled to the CF.

7. The interface of claim 6, wherein the flag is adapted to indicate that no magazine is present when the latch bar is disengaged from the groove of the handle.

8. A combination for processing a plurality of data storage cartridges comprising:
- a drive for receiving a processing data stored on the cartridge by a read/write mechanism;
- a magazine having a frame with shelves for holding a multiplicity of cartridges having a first open side and a second open side;
- a cartridge feeder (CF) having a transport mechanism for transporting a cartridge between the first open side of the magazine and the drive; and
- a CF interface that is coupled to the magazine that is adapted to position the magazine relative to the CF and to couple the magazine to the CF; wherein
- the second open side of magazine is adapted to allow access to at least one cartridge of the multiplicity of data storage cartridges without interrupting operation of the CF;
- the CF interface further includes a latch bar that is coupled to the CF that is adapted to engage the handle when the magazine is positioned relative to the CF; and
- the frame supports a light sensor and the latch bar includes a flag that moves relative to the frame with the latch bar, such that when the latch bar engages the handle then the light sensor is activated by the flag to indicate that the magazine is coupled to the CF.

9. The magazine of claim 8, wherein the flag is adapted to indicate that no magazine is coupled to the CF when the latch bar is disengaged from the handle.

* * * * *

UNITED STATES PATENT AND TRADEMARK OFFICE
CERTIFICATE OF CORRECTION

PATENT NO. : 5,659,440
DATED : August 19, 1997
INVENTOR(S) : Acosta et al

It is certified that error appears in the above-indentified patent and that said Letters Patent is hereby corrected as shown below:

Column 13, line 3, change "a" (2nd occurrence) to --and--
line 15, add --the-- between "of" and "magazine".

Signed and Sealed this

Twenty-fourth Day of February, 1998

Attest:

BRUCE LEHMAN

Attesting Officer     Commissioner of Patents and Trademarks